(12) United States Patent
Osipov et al.

(10) Patent No.: US 11,819,767 B2
(45) Date of Patent: *Nov. 21, 2023

(54) ELECTRONIC DEVICE WITH A TRANSFORMABLE MULTI-PLANAR SEGMENTED DISPLAY

(71) Applicant: Cubios, Inc., San Rafael, CA (US)

(72) Inventors: Ilya Osipov, Novato, CA (US); Semyon Orlov, Nizhniy Novgorod (RU)

( * ) Notice: Subject to any disclaimer, the term of this patent is extended or adjusted under 35 U.S.C. 154(b) by 0 days.

This patent is subject to a terminal disclaimer.

(21) Appl. No.: 17/246,533

(22) Filed: Apr. 30, 2021

(65) Prior Publication Data

US 2021/0252413 A1 Aug. 19, 2021

Related U.S. Application Data

(60) Division of application No. 16/537,549, filed on Aug. 10, 2019, now Pat. No. 11,000,772, and a (Continued)

(30) Foreign Application Priority Data

Feb. 23, 2017 (RU) .......................... RU2017106039

(51) Int. Cl.
*A63F 13/92* (2014.01)
*A63F 13/25* (2014.01)

(52) U.S. Cl.
CPC .............. *A63F 13/92* (2014.09); *A63F 13/25* (2014.09); *A63F 2300/204* (2013.01); *A63F 2300/30* (2013.01)

(58) Field of Classification Search
CPC ..... A63F 13/92; A63F 13/25; A63F 2300/204
See application file for complete search history.

(56) References Cited

U.S. PATENT DOCUMENTS

| 3,576,936 A | 5/1971 | Fischer |
| 3,655,201 A | 11/1972 | Nichols |

(Continued)

FOREIGN PATENT DOCUMENTS

| CN | 1034181446 A | 12/2013 |
| CN | 2037566509 U | 8/2014 |

(Continued)

OTHER PUBLICATIONS

Examination Report No. 1 dated Dec. 16, 2019 in Australian Patent Application No. 2017345410.

(Continued)

*Primary Examiner* — Neil Abrams
(74) *Attorney, Agent, or Firm* — Cozen O'Connor (57) ABSTRACT

An electronic device with a transformable multi-planar display includes a central body and peripheral elements. Each peripheral element has outward-facing sides and inward-facing sides. Each outward-facing side comprises a microprocessor-controllable electronic display screen. Each inward-facing side includes a contact group of electrical contacts arranged to engage with another contact group of electrical contacts of another other one of the peripheral elements. Each contact group includes a plurality of permanent magnets, a plurality of sockets recessed in a corresponding inward-facing side, each socket defining a cavity that houses a corresponding permanent magnet and has an aperture through which at least a portion of the housed permanent magnet is permitted to protrude. A retention spring is situated within each socket and coupled to the housed permanent magnet. The retention spring exerts a biasing force to retain the permanent magnet in a recessed position when there is no engagement with another contact group.

12 Claims, 10 Drawing Sheets

Related U.S. Application Data continuation-in-part of application No. 16/074,787, filed on Aug. 2, 2018, now Pat. No. 10,886,050, said application No. 16/537,549 is a continuation-in-part of application No. PCT/RU2018/050016, filed as application No. PCT/US2017/057296 on Oct. 19, 2017.

(60) Provisional application No. 62/462,715, filed on Feb. 23, 2017, provisional application No. 62/410,786, filed on Oct. 20, 2016.

(56) References Cited

U.S. PATENT DOCUMENTS

| | | | |
|---|---|---|---|
| 4,513,970 | A | 4/1985 | Opresco et al. |
| 4,546,267 | A | 10/1985 | Urfirer |
| 5,941,714 | A | 8/1999 | Gorbet |
| 6,469,901 | B1 | 10/2002 | Costner |
| 6,919,787 | B1 | 7/2005 | Macken |
| 6,974,130 | B2 | 12/2005 | Sugden |
| 7,322,873 | B2 | 1/2008 | Rosen et al. |
| 7,828,556 | B2 | 11/2010 | Rodrigues |
| 7,862,415 | B1 | 1/2011 | Ghaly |
| 7,997,970 | B2 | 8/2011 | Katz et al. |
| 8,187,006 | B2 | 5/2012 | Rudisill et al. |
| 8,395,465 | B2 | 3/2013 | Lauder et al. |
| 8,873,239 | B2 | 10/2014 | McRae et al. |
| 9,111,382 | B2 | 8/2015 | Ueno et al. |
| 9,300,081 | B2 | 3/2016 | Rudisill et al. |
| 9,597,607 | B2 | 3/2017 | Bdier |
| 9,755,356 | B1 | 9/2017 | Kim et al. |
| 9,907,195 | B2 | 2/2018 | Montazeri |
| 10,063,009 | B2 | 8/2018 | Szeto |
| 10,376,804 | B2 | 8/2019 | Lu |
| 10,512,853 | B2 | 12/2019 | MacDonald et al. |
| 10,886,050 | B2 * | 1/2021 | Osipov .................. H01F 7/021 |
| 10,886,051 | B2 * | 1/2021 | Osipov ................ A63H 33/042 |
| 11,000,772 | B2 * | 5/2021 | Osipov .................. A63F 13/90 |
| 11,469,023 | B2 * | 10/2022 | Osipov .................. H01R 11/30 |
| 2010/0197148 | A1 | 8/2010 | Rudisill et al. |
| 2010/0308536 | A1 | 12/2010 | Stolten |
| 2011/0084474 | A1 | 4/2011 | Paden et al. |
| 2012/0258436 | A1 | 10/2012 | Lee |
| 2012/0302303 | A1 | 11/2012 | Rosendo |
| 2013/0109267 | A1 | 5/2013 | Schweikardt et al. |
| 2014/0325413 | A1 | 10/2014 | Delfino |
| 2014/0363987 | A1 | 12/2014 | Hodge et al. |
| 2016/0268729 | A1 | 9/2016 | Szeto |
| 2017/0264046 | A1 | 9/2017 | Szeto |
| 2018/0311566 | A1 | 11/2018 | Shin |
| 2019/0358549 | A1 | 11/2019 | Osipov et al. |
| 2020/0161037 | A1 | 5/2020 | Osipov |

FOREIGN PATENT DOCUMENTS

| | | |
|---|---|---|
| CN | 106110651 A | 11/2016 |
| EP | 2130569 A2 | 12/2009 |
| JP | 2009512484 A | 3/2009 |
| JP | 2009291462 A | 12/2009 |
| KR | 20070104336 A | 10/2007 |
| KR | 1020130023842 A | 3/2013 |
| KR | 1020160083948 A | 12/2016 |
| RU | 2556489 C2 | 7/2015 |
| WO | 2010088695 A1 | 8/2010 |
| WO | 2010120780 A1 | 10/2010 |
| WO | 2012158616 A2 | 11/2012 |
| WO | 2015070321 A1 | 5/2015 |

OTHER PUBLICATIONS

Response to Examination Report No. 1 dated Dec. 16, 2019 filed in Australian Patent Application No. 2017345410 on Jan. 8, 2020.
Examination Report dated Aug. 28, 2020 in Australian Patent Application No. 201822506.
European Search Report dated Sep. 18, 2020 in European Patent Application No. 17861796.5.
Response to European Search Report dated Sep. 18, 2020 in European Patent Application No. 17861796.5 filed Apr. 6, 2021.
European Search Report dated Dec. 17, 2020 in European Patent Application No. 18756842.3.
Response to European Search Report dated Dec. 17, 2020 in European Patent Application No. 18756842.3 filed Jul. 29, 2021.
Examination Report dated Aug. 18, 2020 in Indian Patent Application No. 201947019145.
Response to Examination Report dated Aug. 18, 2020 in Indian Patent Application No. 201947019145 filed Feb. 16, 2021.
International Search Report and Written Opinion issued in International Application No. PCT/US2017/057296 dated Feb. 1, 2018.
Notice of Reasons for Refusal dated Aug. 4, 2020 in Japanese Patent Application No. 2019-543169.
Response to Notice of Reasons for Refusal dated Aug. 4, 2020 in Japanese Patent Application No. 2019-543169 filed Feb. 18, 2021.
Notice of Reasons for Rejection dated Jun. 29, 2021 in Japanese Patent Application No. 2019-543169.
Response to Notice of Reasons for Rejection dated Jun. 29, 2021 in Japanese Patent Application No. 2019-543169 filed Sep. 29, 2021.
Notice of Reasons for Refusal dated Sep. 29, 2020 in Japanese Patent Application No. 2019-567222.
Response to Notice of Reasons for Refusal dated Sep. 29, 2020 in Japanese Patent Application No. 2019-567222 filed Mar. 25, 2021.
Notification of Opinion Submission dated Oct. 15, 2020 in Korean Patent Application No. 10-2019-70144440.
Response to Notification of Opinion Submission dated Oct. 15, 2020 in Korean Patent Application No. 10-2019-7014440 filed Mar. 15, 2021.
Notification of Opinion Submission dated Feb. 16, 2021 in Korean Patent Application No. 10-2019-7024861.
Response to Notification of Opinion Submission dated Feb. 16, 2021 in Korean Patent Application No. 10-2019-7024861 filed May 17, 2021.
Notice of Preliminary Rejection dated Jan. 4, 2022 in Korean Patent Application No. 10-2021-7040485.
[Ball Mouse] The most popular item in FPS games, it must be a ball mouse, Internet Naver end of blog post, Mar. 29, 2013.
File History of parent U.S. Appl. No. 16/074,787, filed Aug. 2, 2018, now U.S. Pat. No. 10,886,050 issued Jan. 5, 2021.
File History of U.S. Appl. No. 16/537,549, filed Aug. 10, 2019, now U.S. Pat. No. 11,000,772 issued May 11, 2021.
File History of U.S. Appl. No. 16/986,069, filed Aug. 5, 2020, now U.S. Pat. No. 10,886,051 issued Jan. 5, 2021.
Office Action dated Sep. 21, 2021 in Canadian Patent Application No. 3,092,094.
Response to Office Action dated Sep. 21, 2021 in Canadian Patent Application No. 3,092,094 filed Jan. 19, 2022.
Office Action dated Aug. 25, 2021 in Canadian Patent Application No. 3,079,193.
Response to Office Action dated Aug. 25, 2021 in Canadian Patent Application No. 3,079,193 filed Dec. 23, 2021.
Examination Notice dated Nov. 18, 2021 in Chinese Patent Application No. 201780061382.0.
Preliminary Office Action dated Feb. 15, 2022 in Brazilian Patent Application No. BR112019008034-1.

* cited by examiner

ELECTRONIC DEVICE WITH A TRANSFORMABLE MULTI-PLANAR SEGMENTED DISPLAY

PRIOR APPLICATIONS

This Application is a divisional of U.S. application Ser. No. 16/537,549, filed Aug. 10, 2019, which claims priority under 35 U.S.C. 120 and 365(c) to International Application PCT/RU2018/050016 filed Feb. 15, 2018, which in turn claims priority to Russian Federation Application No. 2017106039 filed Feb. 23, 2017. This Application also claims priority under 35 U.S.C. 120 to U.S. application Ser. No. 16/074,787 filed Aug. 2, 2018 (now U.S. Pat. No. 10,886,050), claiming priority under 35 U.S.C. 371 to International Application PCT/US17/57296 filed Oct. 19, 2017, which in turn claims priority to U.S. Provisional Application No. 62/462,715 filed Feb. 23, 2017, and U.S. Provisional Application No. 62/410,786 filed Oct. 20, 2016. The disclosures of each of the prior-filed applications are incorporated by reference herein.

BACKGROUND OF THE DISCLOSURE

Electronic devices comprising displays have been used for various purposes, i.e. visual presentation, learning and entertainment, including use as puzzles.

Known volumetric transformable display electronic devices inspired by 3×3×3 Rubik's Cube tend to rely on a single microprocessor and mechanical spring contact groups to support power supply and date exchange between peripheral elements of the device. The center cubelets of each edge are attached to an axle that allows rotation of that center cubelets only as allowed by its manner of attachment to the axle (or core), typically with springs and rivets.

The use of rigid mechanical axles affixed to edge-center elements, and spring mechanical contacts to support power supply and date exchange between peripheral elements in such devices leads to low reliability, frequent wear, and instability of power and data flow in the course of frequent transformative rotations of the groups of cubelets.

For the purpose of the present disclosure, the terms shall be given the following meanings: transformable display is a display consisting of separate sub-displays of smaller size that can change location relative to one another; a peripheral element is, in contrast to the central element, located outside the device, so it can be always visible; the outer face of the peripheral element is a flat surface of the peripheral element facing the user, and the inner face of the peripheral member is a flat surface of the peripheral element facing away from the user, i.e. to a central unit.

SUMMARY

The present disclosure relates to electronic devices with bulk transformable display, comprising a plurality of peripheral elements with planar faces adapted to the movement and rotation around the central element. Each of the peripheral elements comprises at least one display disposed on the outer faces of the peripheral element, a contact element group, a microprocessor and a power source. The contact group of said peripheral elements are formed by magnets, adapted to connect adjacent peripheral elements to each other and simultaneously transmitting electrical signals therebetween.

In one embodiment of the device, said magnets are in the form of spheres or spherical beads, or balls, placed inside spherical sockets allowing for free spatial orientation ("ball magnets" hereinafter). This applicant has earlier disclosed related arrangements in the international application PCT/US2017/057296 and the US national application U.S. Pat. No. 16/074,787, both incorporated hereby in their entirety. Such connector arrangement enables self-rotating magnets to adjust their spatial orientation interacting with magnets of another element when the two are brought in proximity.

In another embodiment, the magnets are in the form of balls arranged to enable attachment to the contact group washers, while retaining ability to rotate around their centers.

The magnetic contact embodiments disclosed hereby enable configuring transformable electronic devices from separate stationary elements, mutually connected by magnetic forces only, absent mechanical axles with associated moving parts wear and electrical connection instabilities.

The benefit of the disclosed electronic device is improved stability in continuous operation, in reliability and durability of the device.

The electronic device with a volumetric transformable display has been reduced to practice as a 2×2×2 cube-shaped embodiment with a center steel ball surrounded by eight identical peripheral elements, each having three displays on its outwards-facing surfaces.

Considerable experimentation with the prototypes of the electronic device with transformable three-dimensional display indicated that it:

it enables easy relative movement of individual peripheral elements;
ensures secure fit between the peripheral element;
ensures reliable electrical connection between the peripheral elements.

Thus, in the disclosed device enabled increased reliability and durability.

Some exemplary applications of the transformable devices include, but not limited to: a novel gaming platform; a device supporting development of users cognitive abilities and special imagination; a new digital desktop device to display e.g. notification of a mail or message, exchange rates, stock prices, weather, movies in the neighboring theaters, etc., or a multi-user display presenting different information for different users (e.g., client worker situation where the viewers face each other and see different sides of the device.)

DETAILED DESCRIPTION

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

Figure 1:
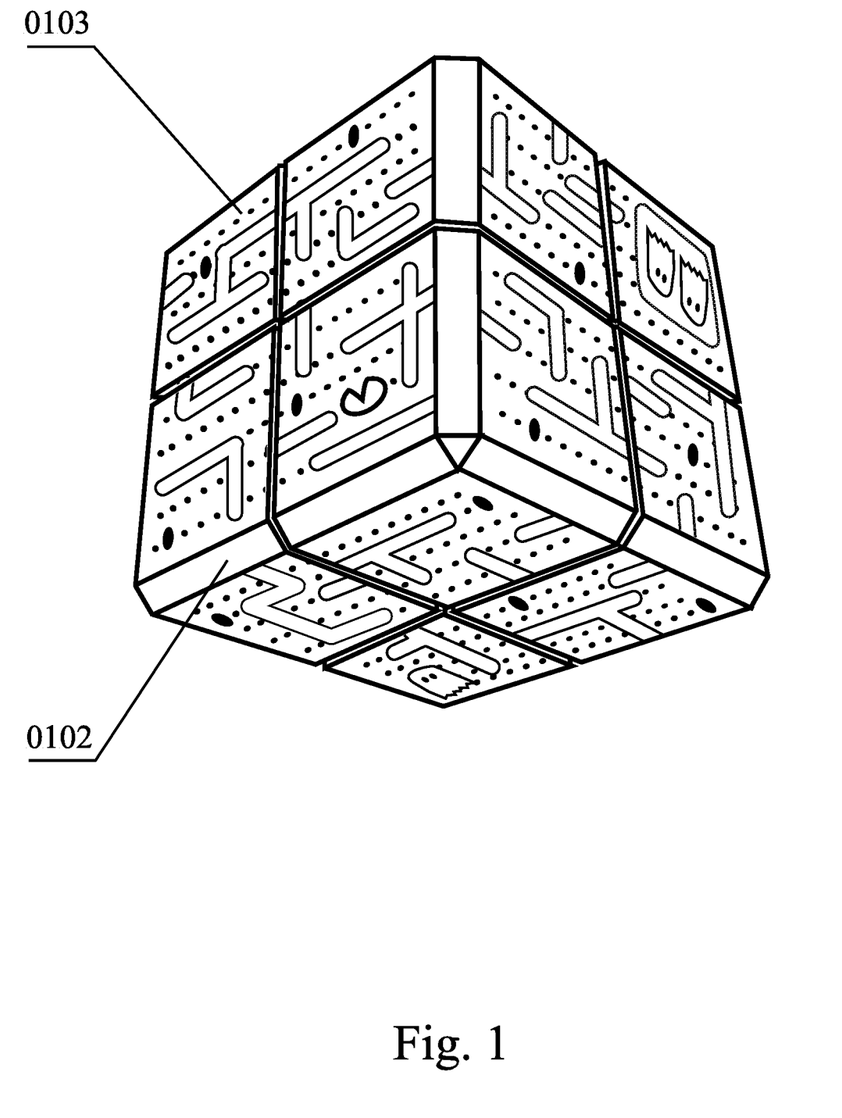
FIG. 1 is a perspective view of a 2×2×2 preferred embodiment of the electronic transformable display device in a static configuration.
Figure 2:
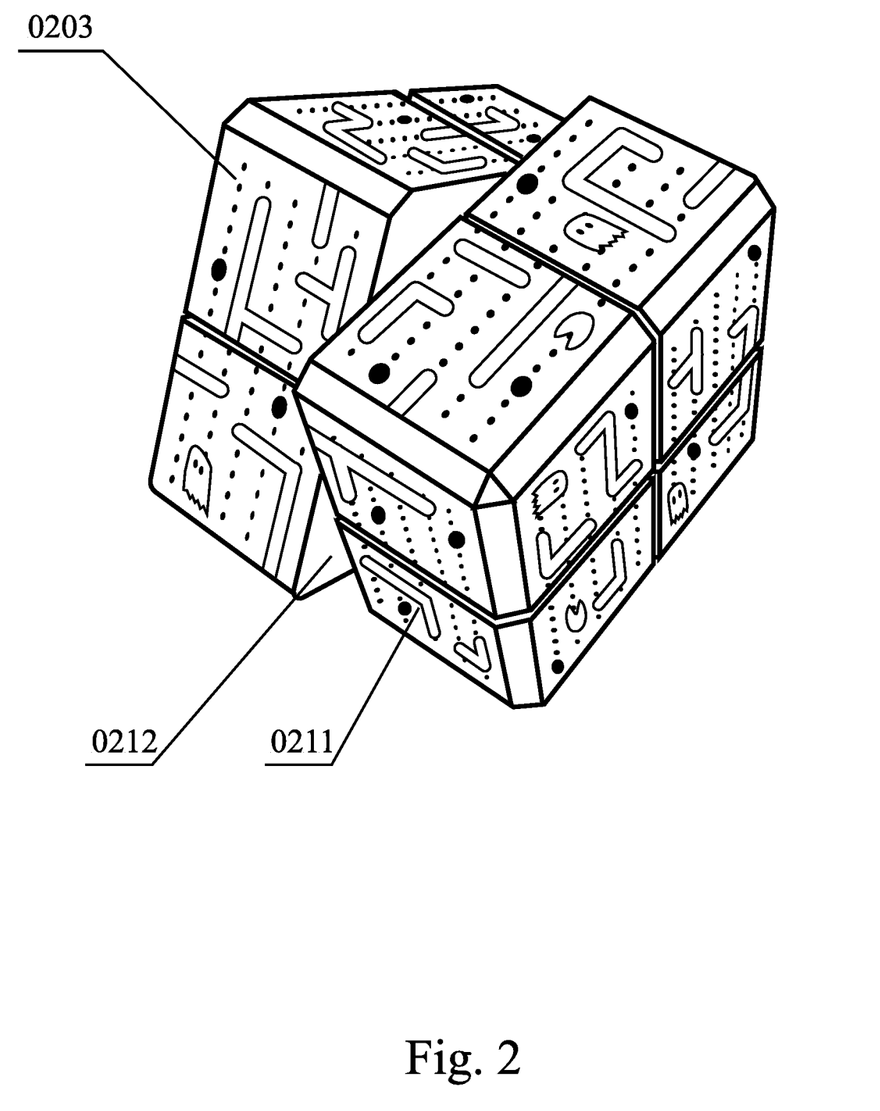
FIG. 2 is a perspective view of said electronic device in the transformation process.

Referring to the embodiments presented in FIGS. 1-11, each of the elements 202 and 203 shown in FIG. 2 correspond to like-numbered elements 0102 and 0103 shown in FIG. 1, which have been described previously. For example, peripheral element 0202 shown in FIG. 2 corresponds to peripheral element 0102 shown in FIG. 1, and so on.

Figure 3:
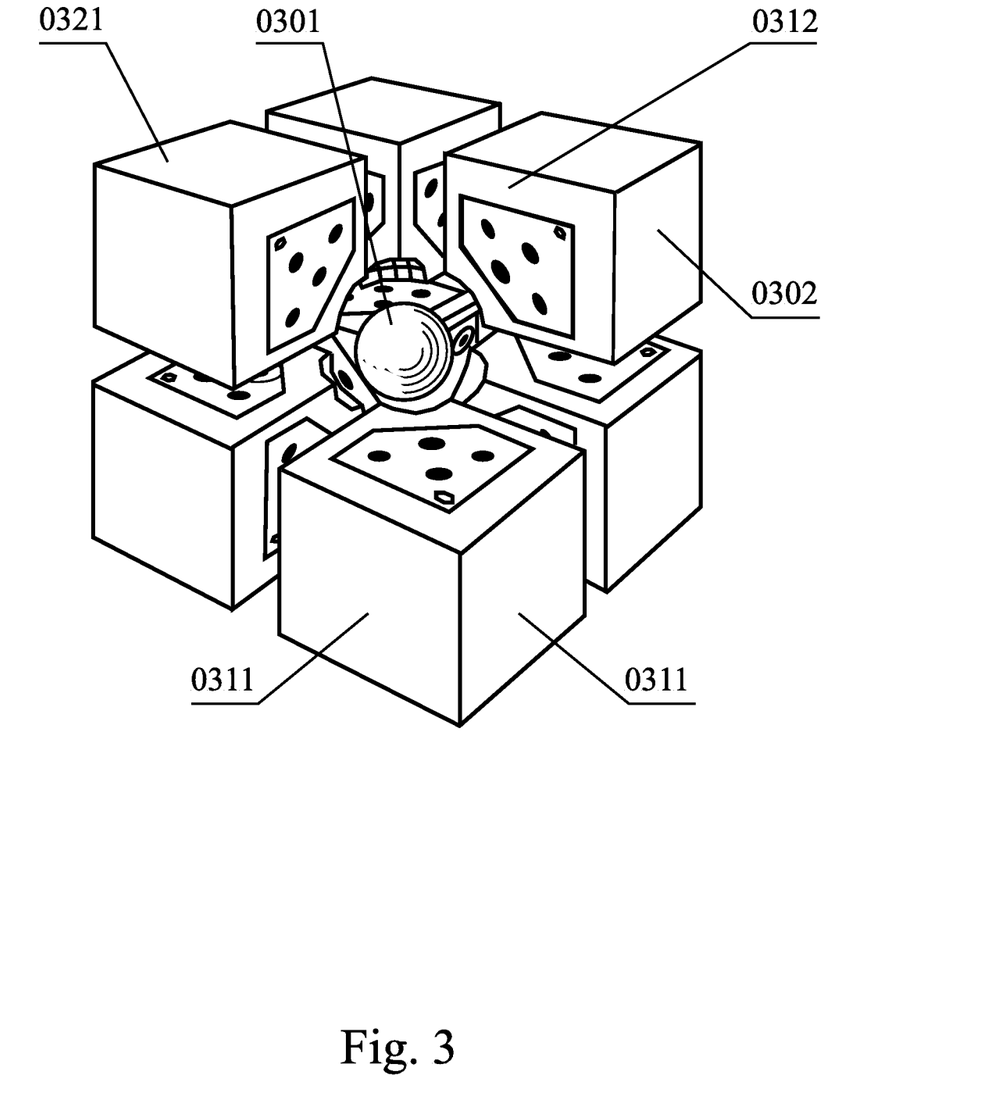
FIG. 3 is a perspective partially exploded view of said electronic device, demonstrating the central element.

An electronic device with a three-dimensional transformable display includes a central body 0301, around which is disposed a plurality of peripheral elements 0102 having flat sides 0221 and adapted to the movement and rotation around the central element 0301.

Each peripheral element 0102 has at least one display 0103 disposed on the outer face 0321 and at least one connector group 0404 disposed on its inner face 0312. Each of the peripheral elements 0102 has a microprocessor 0505 connected with its own power source 0506. The microprocessor 0505 and the power source 506 are arranged within said peripheral element 0102.

Figure 4:
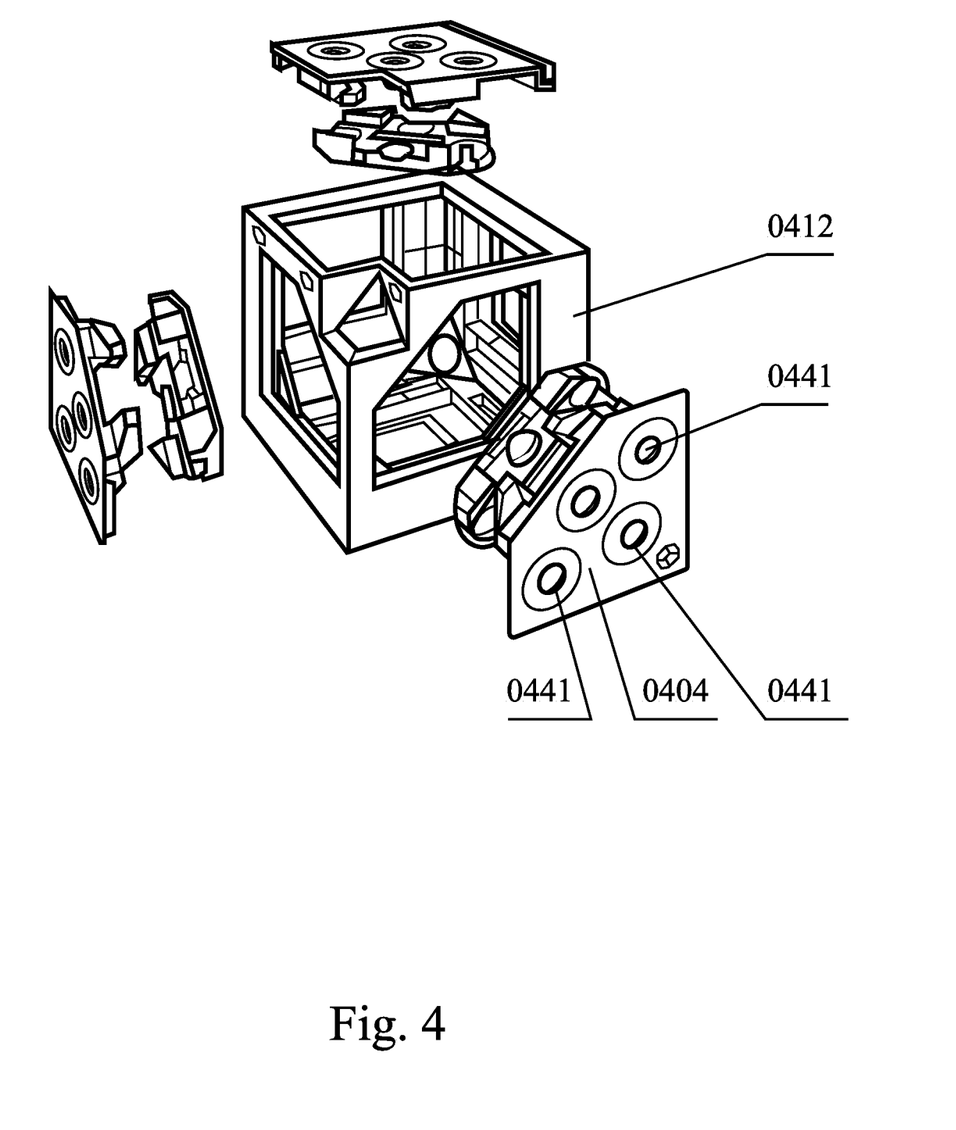
FIG. 4 presents an exemplary embodiment of a peripheral element with mechanical components.

The contact group 404 of the peripheral element 0102 is formed by magnets 0441, adapted to mutually connect adjacent peripheral elements maintaining transmission of the electrical signal therebetween.

General Operation of Electronic Device with a Three-Dimensional Transformable Display The electronic device with a volumetric transformable display may operate as follows. The following generalized exemplary description, however, should not be understood as limiting the disclosure, representing a best presently known mode of making and using the invention.

Each peripheral element comprises a microprocessor, a power supply (rechargeable battery), connected with display or displays positioned on its their outer faces. Thus, each peripheral element is akin to a separate stand-alone device. Being attached by means of magnetic connectors to each other, the peripheral elements are capable to synchronize and operate as a unified device with image coordinated over all display surfaces.

Thus, one can assemble a combined electronic device which outputs a plurality of individual displays as a single overall image, or a combination of several individual common image, e.g., each at its face.

An important feature of such an electronic device is its transformability, i.e. the mobility of individual peripheral elements and the possibility of fixing each other in the new position. In some exemplary embodiments the overall shape of the device is maintaining under transformations. In some alternative exemplary embodiments, the overall shape of the device can be transformed as well.

When individual peripheral elements are rotated, the magnetic contacts disengage from adjacent peripheral elements, and then actuated and connected to the newly-adjacent peripheral elements according to a new position. Magnets or magnetic connectors not only hold the structure in position, but also allow to exchange power and information interface signals between the central element and the peripheral elements in all combinations thereof.

In one exemplary embodiment, the central element of the structure is a steel ball. In alternative exemplary embodiments, different materials and shapes may be used to create internal support and enable rotating the peripheral elements around it.

When the inner peripheral face of one peripheral element is placed in proximity of a similar inner peripheral face of another peripheral element, ball magnets rotated by the action of magnetic field, orient their respective magnetic poles to face as SN; NS and stick together, forming a closed electrical circuit. Mutual orientation of the ball magnets polarity facing SS or NN—is impossible because the balls are not fixed, and can rotate in their sockets.

In some alternative exemplary configurations, movable and stationary magnets are used. Stationary magnets may in this case be used to provide magnetic coupling with the central element, e.g. a still ball.

Connectors

In one exemplary embodiment, magnets 0441 may be shaped as balls placed inside spherical sockets 05 enabling said magnets to rotate freely around an arbitrary axis.

Figure 5:
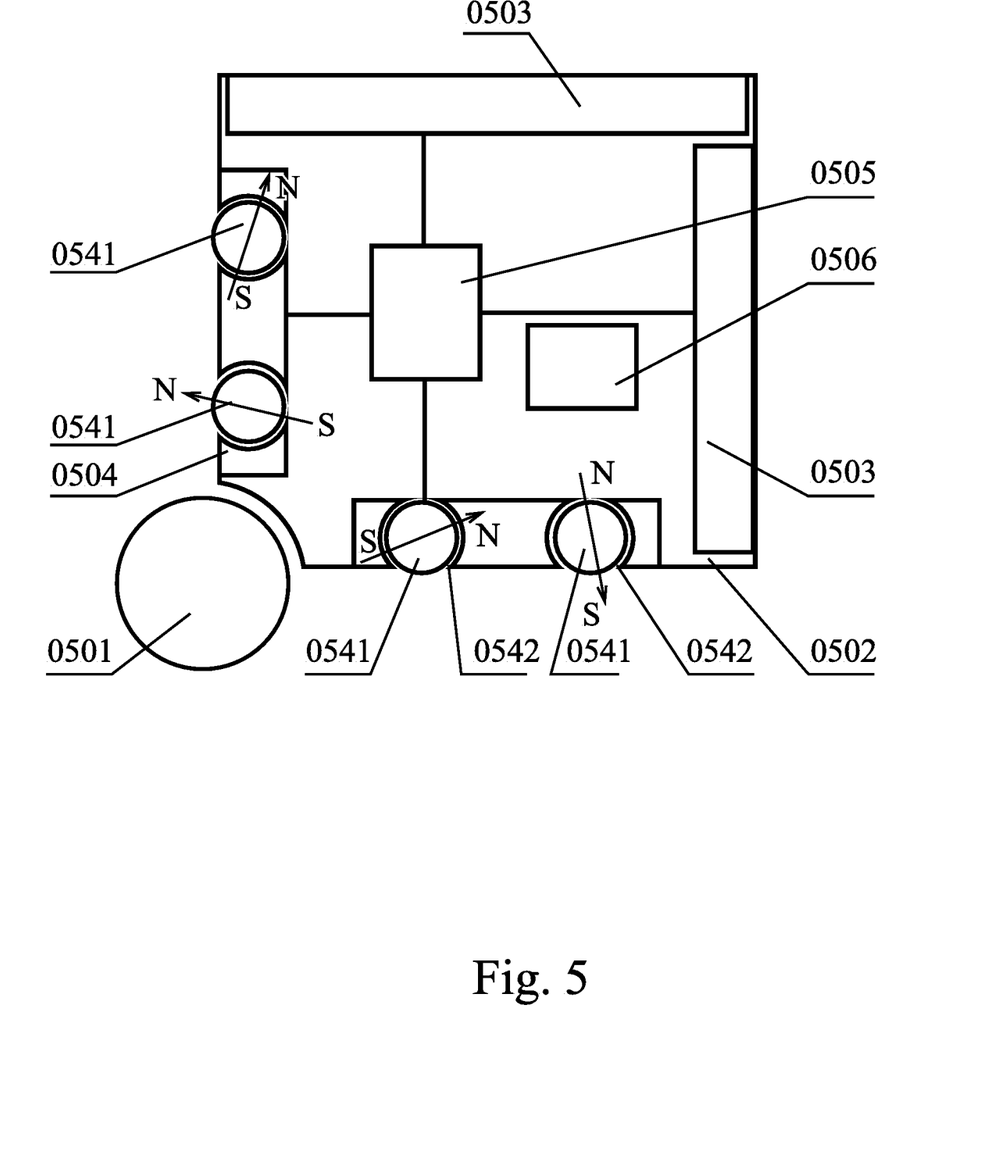
FIG. 5 is a functional diagram of one peripheral element of the electronic with a simplified view of the contact element group.

By way of example, FIG. 5 illustrates a contemplated direction of the magnetic field indicated by an arrow with the letters N and S. As seen, magnetic beads freely oriented.

As soon as one such magnetic ball connector disposed on an inner face of one of the plurality of the peripheral elements is placed in the proximity of a second magnet ball connector located on another peripheral element, the two balls interact magnetically, their opposite poles attracted to each other, and rotate inside the respective spherical sockets 0542. The balls mutually attract and orient in such a way that their respective magnetic fields are aligned in opposing directions.

The diameter of the magnet is chosen to be somewhat smaller than the diameter of the spherical socket 0542, i.e. some gap is maintained that allows the magnet 0541 to advance slightly towards the inner face of the opposing peripheral element, which solves the problem of unstable gap between the different peripheral elements.

Thus, the connectors on the inner faces of the two peripheral elements mutually lock enabling passage of electric current between the now adjacent inner faces of the two peripheral elements. The magnets themselves are made of conductive material, and the resultant electrical circuit allows to supply power and/or exchange data between the peripheral elements.

Figure 6:
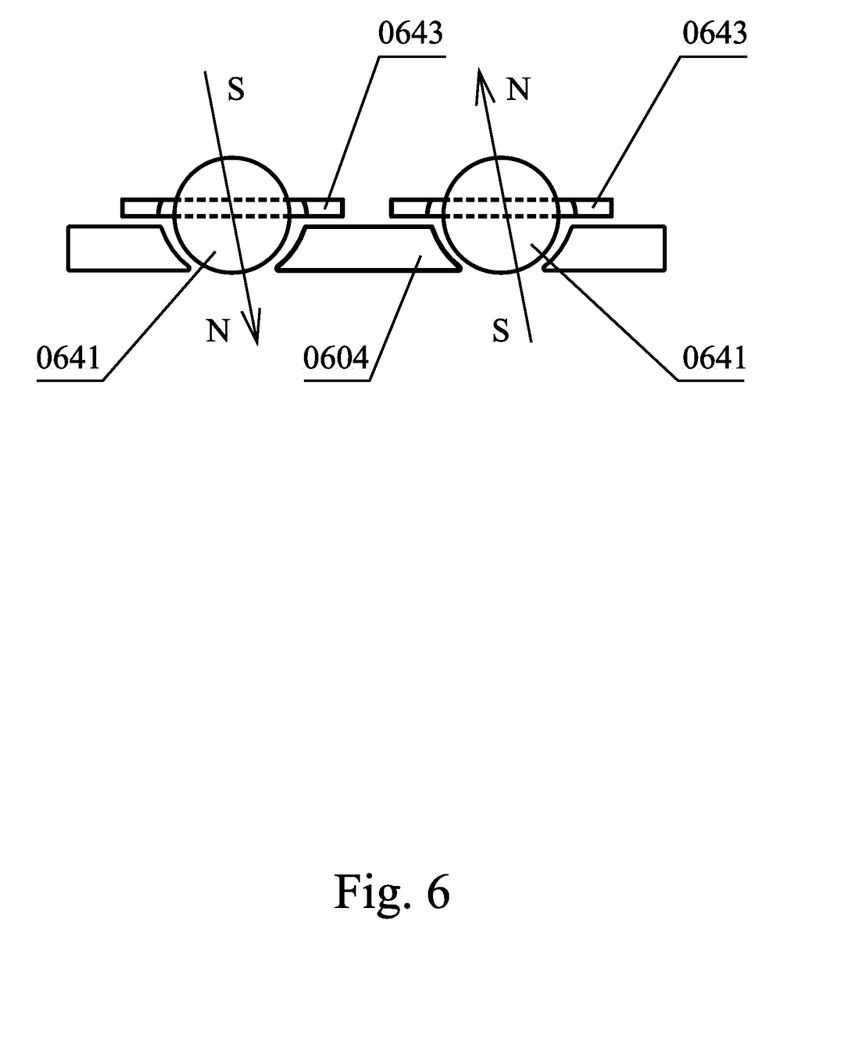
FIG. 6 is a sectional view of a connector group of one of the peripheral elements.
Figure 7:
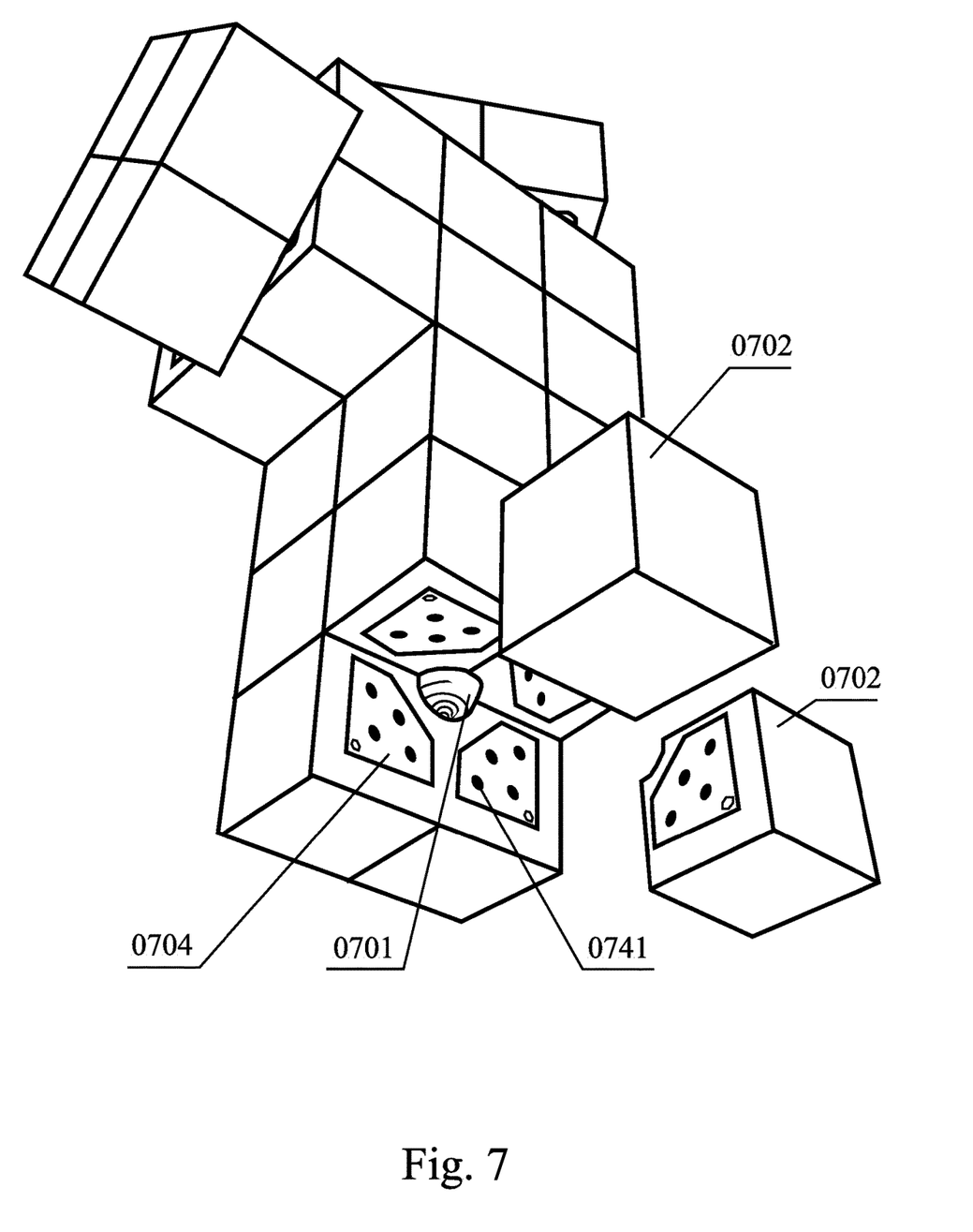
FIG. 7 is a perspective view of a 2×2×2 preferred embodiment with a partially exploded view presenting one of a plurality of central elements.

In another exemplary embodiment, generally spherical sockets 0542 may be replaced with conductive retaining washers 0643 made of ferromagnetic material, which allow the magnet to rotate, but retain it in the proximity of the inner face of the peripheral element, see. FIG. 6.

Figure 8:
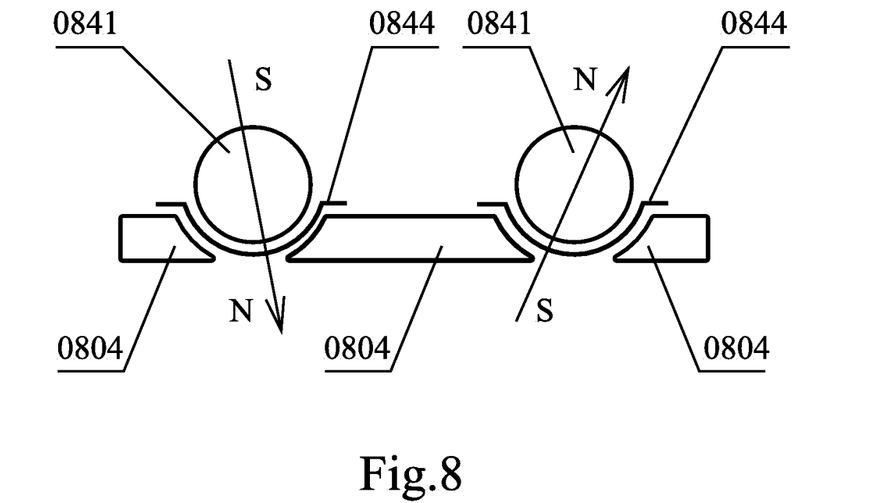
FIG. 8 is a sectional view of a connector group comprising protective plates.

In yet another exemplary embodiment, the ball magnets 0841 are covered with protective plates 0844 made of conductive non-magnetic material, for example brass, that act as contacts, see FIG. 8.

This configuration enables free spatial orientation of the ball magnet. The plates cover the ball magnets from outside, providing improved electrical connection.

To understand the advantage of this embodiment, consider the baseline example shown in FIG. 6. Maintaining closed electrical circuit between two adjacent peripheral elements requires three points of contact:

1) First conductive retaining washer to first ball magnet;
2) First ball magnet to second ball magnet, and
3) Second ball magnet to second conductive retaining washer The use of conductive plate reduces the number of surfaces in direct contact to the opposing connector from three to one. The plate itself acts as a conductor, in this case, the aligning ball magnet only serves to provide a force supporting self-actuation in the proximity of the opposing connector; it is not included as a necessary segment of the continuous conductive path. A single point of electrical continuity between first conductive plate to second conductive plate needs to be maintained.

Given the aggressive mission profile of dynamic mechanical stresses the electrical connectors experience in transformative electronic devices, increased number of serially connected contact points increases probability of loss of conductive path continuity.

Experimenting with the type of electrical connectors shown in FIG. 8, we found improved stability of electrical connections, which we attribute to the reduced number of points of contact in series needed to maintain continuous conductive path.

Using brass as a plate material enables the connector design.

Figure 9:
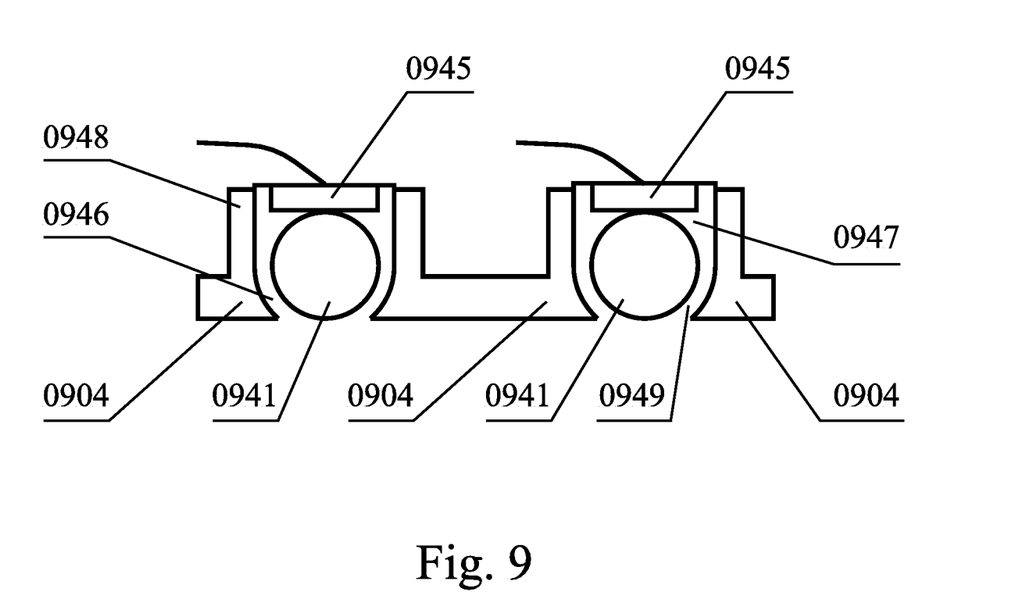
FIG. 9 is a sectional view of a connector group comprising ferromagnetic conductor members.

In a further exemplary embodiment, a ball magnet 0941 and a ferromagnetic conductor member 0945 are placed inside a socket 0946, see FIG. 9.

The socket 0946 has a section 0949 directly connected to the inner face 0912 and a rearchamber section 0947 opposing the inner face 0912 of the peripheral element. The socket section adjacent the inner face 0912 is in general shape of a hemisphere of a radius slightly larger than the radius of the ball magnet. The difference between said two radii is chosen to enable free rotation of the ball magnet 0941.

The ferromagnetic conductor member 0945 is placed in the rearchamber section 0947 adjacent ball magnet 0941 opposite the inner face 0912 of the peripheral element 0904. In one exemplary embodiment, the rear section chamber 0947 of the socket is shaped as a cylindrical surface, and the ferromagnetic conductor member 0945 is shaped as a disk or a cylinder. In an alternative embodiment, the rear section chamber 0947 of the socket is shape d as a rectangular or square cross section, and the ferromagnetic conductor member 0945 is shaped as a flat plate of a rectangular or square shape. The ferromagnetic conductor member 0945 is not attached to the side walls 0948 of the socket 0946 which restrict its lateral movement and rotation, and its dimensions are selected to allow movement towards the inner face 0912 as the connector is activated in the proximity of an opposing connector. When the connectors are disengaged, the ferromagnetic plate may move away from the inner face 0912 while remaining attached to ball magnet 0941.

Our experimentation reveled that this configuration provides improved durability of connector versus the baseline configuration disclosed above.

Figures 10A, 10B, 10C:
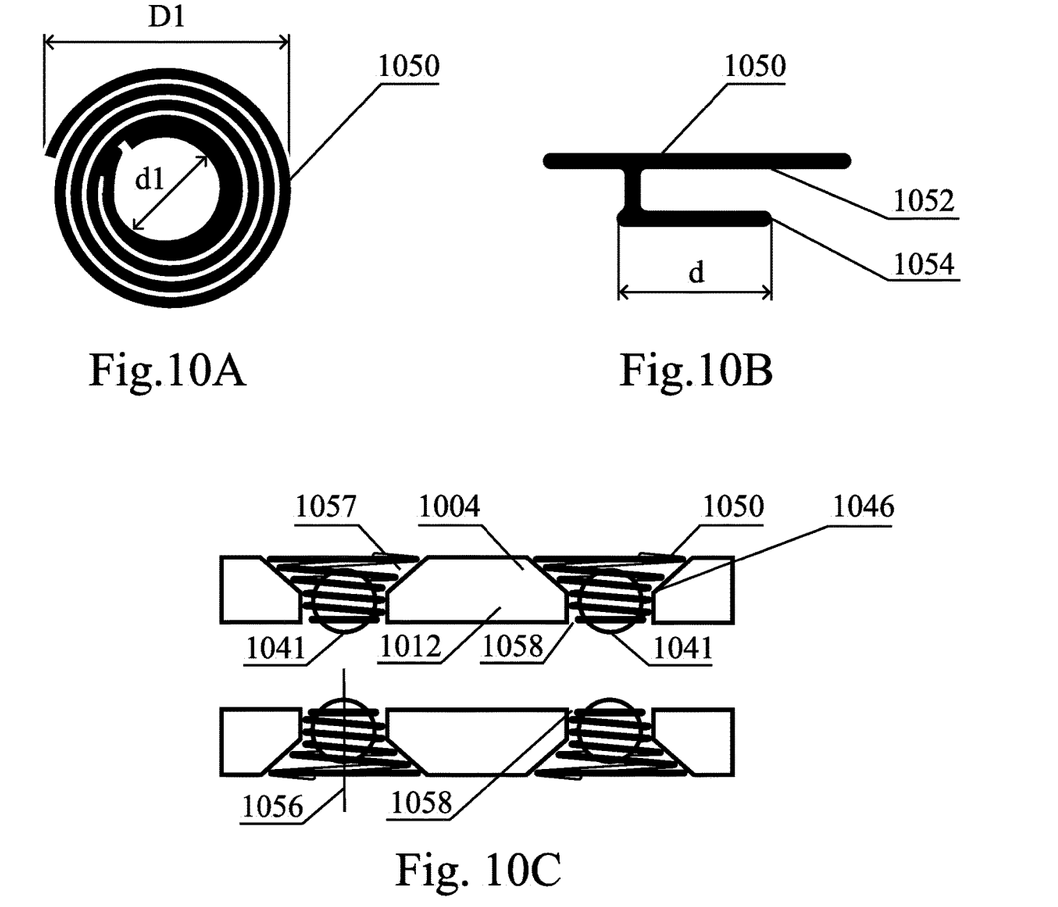
FIG. 10A is a top view of spiral spring.
FIG. 10B is a side view of spiral spring.
FIG. 10C is a sectional view of connector group comprising spiral spring in disengaged position.

In an alternative exemplary embodiment, an electrical contact comprises a ball magnet 1041, a spiral spring 1050, and the socket 1046 arranged as shown in FIG. 10C.

The socket 1048 comprises a retention chamber 1057 with its inner surface shaped as a truncated cone, its smaller base facing the inner face 1012 of the peripheral element 1004, the smaller base being connected to the inner face 1012. The axis 1056 of retention chamber 1047 is arranged in a direction generally normal to the plane of the inner face 1012. In one alternative example an extension chamber 1058 is shaped as a cylindrical surface having a first base and a second base, the first base being directly connected to the retention chamber 1047, and the second base directly connected to the inner face 1012.

The spring 1050 is selected for its inner curl diameter d1 to be slightly smaller than the ball magnet diameter enabling reliable electrical connection to the ball magnet. The spring is of generally spiral shape, see FIG. 10A, with its inner curl 1054 adapted to retain ball magnet 1041, see FIGS. 10B-D. The spring is manufactured of a ferromagnetic high-carbon content steel. It provides mechanical connection to the peripheral element 1004. The diameter D1 of the outer curl 1052 of the spiral spring diameter of the smaller base is selected to exceed the diameter of the smaller base of the truncated cone, ensuring spring outer curl retention inside the retention chamber in both engaged and disengaged positions of the connector.

In the disengaged configuration, FIG. 10C, the ball contact 1041 is retrieved into the retention chamber, its magnetic moment in arbitrary orientation.

Figure 10D:
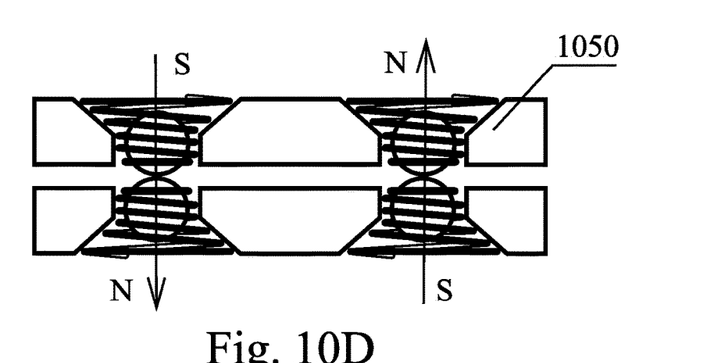
FIG. 10D is a sectional view of connector group comprising spiral spring in actuated position.

When placed in proximity of another peripheral element, the connector is actuated with the ball magnet aligned mutually with its counterpart, the force exerted by the spiral spring exceeded by the force of magnetic attraction between the ball magnets, and the continuous electrical connection is formed, see FIG. 10D.

When the connector is being disengaged, the mechanical force applied to the spring exceeds the magnetic attraction between the ball magnets in engaged position, and they separate, with magnetic attraction further weakening, and the ball magnets retrieved into their respective sockets.

Our experimentation with this exemplary embodiment revealed increased strength of ball magnet retention, and improved contact integrity due to limited ball freedom of mobility.

Figure 11A:
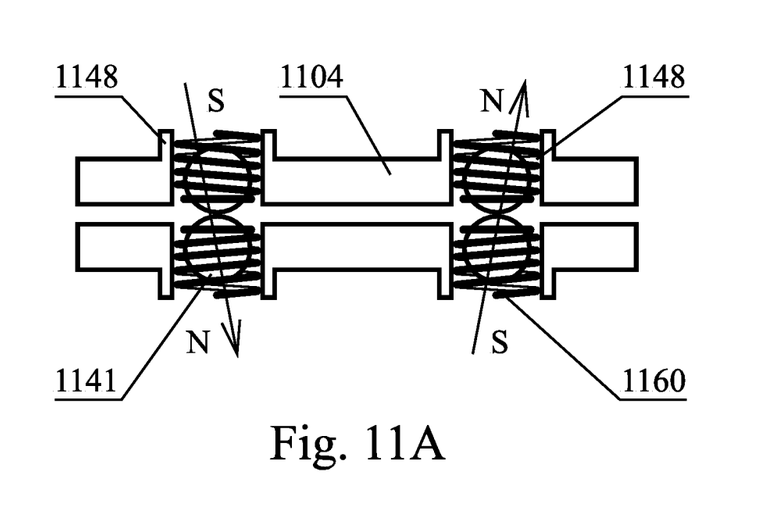
FIG. 11A is a sectional view of connector group comprising cylindrical spring in actuated position.
Figure 11B:
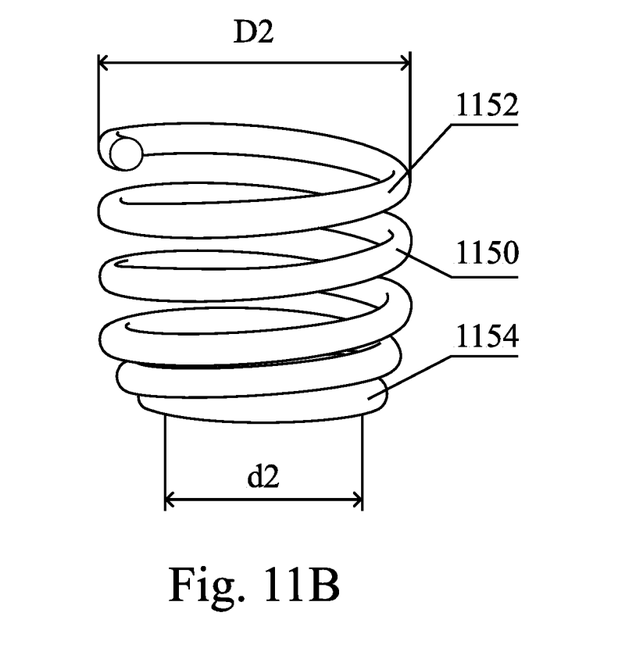
FIG. 11B. is a side view of cylindrical spring.

In another alternative exemplary embodiment, an electrical contact comprises a ball magnet 1141, a cylindrical spring 1150, and the socket 1148 arranged as shown in FIGS. 11A-B.

The spring 1150 is shaped in generally cylindrical form, with body curl 1152 diameter D2; the front-end curl 1154 diameter d2 to be slightly smaller than the ball magnet diameter enabling reliable electrical connection to the ball magnet and magnet retention inside the envelope of the spring, see FIG. 11B. The spring is manufactured of a ferromagnetic high-carbon content steel. It provides reliable mechanical connection to the peripheral element 1104.

The socket 1148 is generally shaped as a cylindrical surface, having a first base and a second base, the second base directly connected to the inner face 1012, and the first base having means enabling retention of the cylindrical spring 1150; the socket is adapted to support spring expansion/contraction supporting contact actuation and disengagement.

Contact Groups

In one exemplary embodiment, magnets 441 may serve four electrical connectors: first—"Ground", the second—"+5V", third and fourth—serial ports for receiving and transmitting data.

In an alternative exemplary embodiment, "ground" connection to the central element may be established without magnets or by means of a connector known in the art.

In some alternative embodiments of the contact group, different types of connectors may be mixed, some of them magnetic, some of them not.

Connectors supporting data exchange may use different protocols for receiving transmitting the data, not limited to serial communication port. Number of connectors in a contact group may vary.

Transformable Device Shapes

In the scope of the present disclosure, device shape may vary widely, but preferably as combinations of polyhedrons. One representative shape is a parallelepiped, preferably a cube, see FIGS. 1-3. The apparatus may consist of a different number of peripheral elements, see e.g. FIG. 7.

Some of the exemplary embodiments for a general form of the electronic device under the present disclosure are:
cube shape of eight peripheral elements arranged 2×2×2;
cube shape of twenty-six peripheral elements arranged 3×3×3;
cube of fifty-six peripheral elements arranged 4×4×4;
slab shapes of arranged peripheral elements, such as 2×2×3, 2×3×3, etc.
prism complex shapes, and
polyhedra having trapezoidal faces.

In various embodiments, the peripheral elements can have different number of displays. In several 2×2×2 examples described in the present disclosure only peripheral elements with 3 displays placed on the outward-facing surfaces have been reduced to practice. In an exemplary 3×3×3 cube embodiment, resembling Rubik's Cube topology, not all peripheral elements are contemplated as identical. On one hand, eight vertex peripheral elements are equipped with three screens, similarly to those in 2×2×2 embodiment. On the other hand, each of the 12 peripheral elements is equipped with two displays. Finally, 6 face-center peripheral elements have a single display.

In general, the peripheral elements can have additional electrical components, including audio sources, microphones, light-emitting diode.

What is claimed is:

1. An electronic device with a transformable multi-planar segmented display, the device comprising:
   a central body; and
   a plurality of peripheral elements surrounding the central body and movable by rotation about the central body, each one of the peripheral elements comprising a plurality of outward-facing sides facing away from the central body, and a plurality of inward-facing sides, wherein each one of the inward-facing sides has an inward-facing surface that faces an inward-facing surface of an inward-facing side of another one of the peripheral elements, wherein:
   each one of the outward-facing sides comprises a microprocessor-controllable electronic display screen;
   each one of the inward-facing sides is repositionable to face a different inward-facing side surface of a different one of the peripheral elements by the rotation of the peripheral elements about the central body;
   each one of the inward-facing sides includes a contact group of electrical contacts arranged to engage with another contact group of electrical contacts of the other one of the peripheral elements and, upon the rotation about the central body of the peripheral elements, to further engage with a different contact group of electrical contacts of the different inward-facing surface of the different one of the peripheral elements and disengage with the other contact group;
   wherein each contact group includes:
   a plurality of permanent magnets;
   a plurality of sockets recessed in a corresponding inward-facing side, each socket defining a cavity that houses a corresponding one of the plurality of permanent magnets, wherein the cavity is larger than a dimension of the housed permanent magnet to permit translational movement of the permanent magnet within the socket, and each socket further including an aperture through which at least a portion of the housed permanent magnet is permitted to protrude beyond the inward-facing surface of the corresponding inward-facing side;
   and a retention spring situated within each socket and coupled to the housed permanent magnet, the retention spring exerting a biasing force to retain the housed permanent magnet in a recessed position within the socket in an absence of engagement of the contact group with any other contact group, and wherein the biasing force is overcome in the presence of engagement of the contact group with any other contact group when the housed permanent magnet is magnetically attracted to another permanent magnet of that other contact group.

2. The electronic device of claim 1, wherein the cavity of each socket has a size and shape to further permit rotational movement of the permanent magnet within the socket.

3. The electronic device of claim 1, wherein the cavity of each socket includes a deep portion and a shallow portion, the deep portion being recessed more deeply in the corresponding inward-facing side than the shallow portion, the shallow portion having the aperture; wherein the deep portion has a greater width than the shallow portion.

4. The electronic device of claim 1, wherein the cavity of each socket includes a deep portion and a shallow portion, the deep portion being recessed more deeply in the corresponding inward-facing side than the shallow portion, the shallow portion having the aperture;

wherein the deep portion has a truncated-conical shape having a wide end and a narrow end and the shallow portion has a cylindrical shape aligned with the narrow end of the deep portion.

5. The electronic device of claim 1, wherein the permanent magnets of each contact group are spherical in shape.

6. The electronic device of claim 1, wherein the spring comprises an inner curl arranged to retain the corresponding permanent magnet.

7. The electronic device of claim 6, wherein the inner curl has a diameter that is smaller than a width of the corresponding permanent magnet.

8. The electronic device of claim 6, wherein the spring has a generally conical spiral form.

9. The electronic device of claim 6, wherein the spring has a generally cylindrical spiral form.

10. The electronic device of claim 1, wherein the spring comprises an outer curl arranged to be retained by an interior of the corresponding cavity.

11. The electronic device of claim 1, wherein the cavity of each socket includes a deep portion and a shallow portion, the deep portion being recessed more deeply in the corresponding inward-facing side than the shallow portion, the shallow portion having the aperture;

wherein the deep portion has a truncated-conical shape having a wide end and a narrow end and the shallow portion has a cylindrical shape aligned with the narrow end of the deep portion; and wherein the spring comprises a spiral wire having an inner curl portion and an outer curl portion, wherein the inner curl portion includes a first spiral diameter that is smaller than a width of the corresponding permanent magnet, and wherein the outer curl portion includes a second spiral diameter that is larger than the a width of the narrow end of the deep portion of the cavity.

12. The electronic device of claim 1, wherein the cavity of each socket has a cylindrical shape.

* * * * *